United States Patent
Moon et al.

(10) Patent No.: US 10,203,470 B2
(45) Date of Patent: Feb. 12, 2019

(54) AUTOFOCUS CAMERA APPARATUS AND METHOD USING MULTIPLE MOTORS

(71) Applicant: Samsung Electronics Co., Ltd., Gyeonggi-do (KR)

(72) Inventors: Chanyoung Moon, Gyeonggi-do (KR); Jonghyeok Chun, Gyeonggi-do (KR); Duseung Oh, Gyeonggi-do (KR); Sangkee Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 125 days.

(21) Appl. No.: 15/347,362

(22) Filed: Nov. 9, 2016

(65) Prior Publication Data

US 2017/0131516 A1  May 11, 2017

(30) Foreign Application Priority Data

Nov. 9, 2015 (KR) ........................ 10-2015-0156851

(51) Int. Cl.
*G02B 7/08* (2006.01)
*G03B 13/36* (2006.01)

(52) U.S. Cl.
CPC ............... *G02B 7/08* (2013.01); *G03B 13/36* (2013.01)

(58) Field of Classification Search
None
See application file for complete search history.

(56) References Cited

U.S. PATENT DOCUMENTS

| | | | | |
|---|---|---|---|---|
| 4,423,941 A | * | 1/1984 | Iwata | G03B 3/10 359/824 |
| 6,853,507 B2 | * | 2/2005 | Ryu | G02B 7/021 359/696 |
| 7,277,237 B2 | | 10/2007 | Saito et al. | |
| 7,333,724 B2 | * | 2/2008 | Chen | G03B 7/10 348/357 |
| 2004/0109081 A1 | | 6/2004 | Sumi | |
| 2007/0133970 A1 | * | 6/2007 | Honjo | G02B 7/08 396/97 |
| 2017/0131516 A1 | * | 5/2017 | Moon | G02B 7/08 |

FOREIGN PATENT DOCUMENTS

KR  10-2011-0011243  2/2011

* cited by examiner

*Primary Examiner* — William B Perkey
(74) *Attorney, Agent, or Firm* — The Farrell Law Firm, P.C.

(57) ABSTRACT

An autofocus camera apparatus and method using multiple motors are provided. The AF camera apparatus includes a housing, an AF lens group disposed in the housing, a processor configured to generate a control signal to control movement of the AF lens group according to a determined focus location, and a plurality of motors configured to move the AF lens group in an optical axis direction according to the control signal of the processor.

16 Claims, 9 Drawing Sheets

AUTOFOCUS CAMERA APPARATUS AND METHOD USING MULTIPLE MOTORS

PRIORITY

This application claims priority under 35 U.S.C. § 119(a) to Korean Patent Application Serial No. 10-2015-0156851, which was filed in the Korean Intellectual Property Office on Nov. 9, 2015, the entire disclosure of which is incorporated herein by reference.

BACKGROUND

1. Field of the Disclosure

The present disclosure relates generally to a camera apparatus, and more particularly, to an autofocusing apparatus and method for use with a camera.

2. Description of the Related Art

A camera using an autofocusing apparatus may include an autofocus (AF) lens that passes and/or refracts light to adjust focus of an image. Such a camera can automatically move an AF lens according to a predetermined focus, without requiring user operation.

In a conventional method for moving an AF lens in an optical axis direction, an actuator rotates a barrel including a cam and the AF lens moves along with the cam. In order to reduce the number of components, simplify structure, and improve autofocusing speed, recently cameras have been configured with a linear type drive unit by which an actuator moves lenses directly in the optical axis direction. For example, a motor, a piezoelectric element and a vibrator, or electromagnetic force have been used in a linear type drive unit.

Recently, a need has emerged to control the movement of a heavier AF lens at a high speed because lenses having a heavier material are being used and the number of lenses has increased in order to improve image quality. However, a conventional AF camera using a motor may not be suitable for moving these heavier lens because of limitations in output power. While additional gears have been used to overcome the weight limitation, which may improve the efficiency of torque transmission, it disadvantageously generates noise.

SUMMARY

Accordingly, an aspect of the present disclosure is to provide an autofocus camera apparatus and method using multiple motors to move a heavy AF lens more precisely.

In accordance with an aspect of the present disclosure, an AF camera apparatus is provided, which includes a housing, an AF lens group disposed in the housing, a processor configured to generate a control signal to control movement of the AF lens group according to a determined focus location, and a plurality of motors configured to move the AF lens group in an optical axis direction according to the control signal of the processor.

In accordance with another aspect of the present disclosure, an AF camera apparatus is provided, which includes a housing, an AF lens group disposed in the housing, the AF lens group including a lens and a barrel surrounding the lens, and a plurality of motors configured to transmit torque to a part of the barrel to move the AF lens group in an optical axis direction. A protrusion is disposed at a side of the barrel so that the housing contacts a rotating axis that rotates by receiving torque from at least one of the motors.

In accordance with another aspect of the present disclosure, a method of autofocusing an AF camera apparatus is provided, which includes determining, by a processor, a determined focus location; generating a control signal to control movement of an AF lens group according to the determined focus location; and operating a plurality of motors to move the AF lens group in an optical axis direction according to the control signal of the processor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
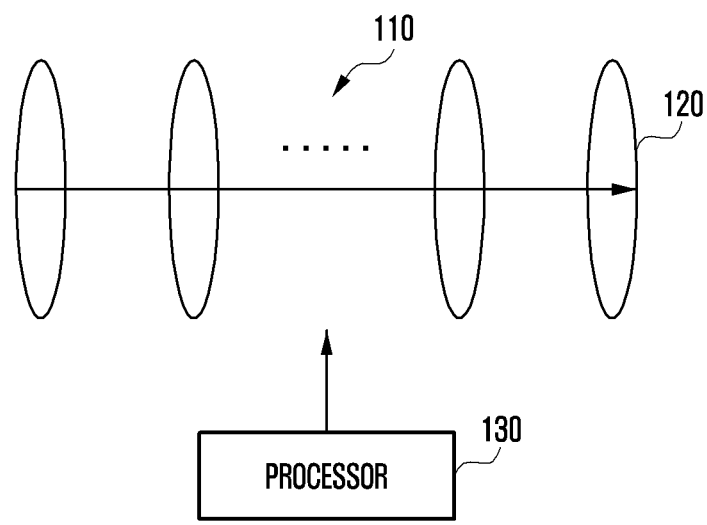
FIG. 1 illustrates a AF camera apparatus according to an embodiment of the present disclosure.

Hereinafter, various embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an example of the principles therein and is not intended to be limited by the specific embodiments.

In the drawing and descriptions, similar reference numbers may refer to the same or like parts.

Terms used in the present disclosure are not intended to limit the present disclosure but to illustrate various embodiments. When used in a description of the present disclosure and the appended claims, a singular form includes a plurality of forms unless it is explicitly represented as such.

Unless differently defined, all terms including technical and scientific terms used herein have meanings that are generally understood by a person of common skill in the art, and should not be analyzed as having ideal or excessively formal meanings unless explicitly defined as such.

Herein, the expressions "comprise", "have", "comprising", and "may comprise" indicate the presence of a corresponding characteristic, numeral, step, operation, element, component, or combination thereof, but do not exclude the presence or addition of at least one other characteristic, numeral, step, operation, element, component, or combination thereof.

The expression "or" includes any combination or the entire combination of together listed words. For example, "A or B" may include A, B, or A and B.

Numerical expressions, such as "first" and "second" may be used to differentiate elements, but do not limit corresponding elements. For example, the expression does not limit order and/or importance of the corresponding elements. For example, both a first user device and a second user device are user devices and represent different user devices. Accordingly, a first constituent element may be referred to as a second constituent element, without deviating from the scope of the present disclosure, and similarly, a second constituent element may be referred to as a first constituent element.

When an element is "coupled" to another element, the element may be "directly coupled" to the other element or "electrically coupled" to the other element through a third element. However, when an element is "directly coupled" to another element, no element may exist between the element and the other element. FIG. 1 illustrates an AF camera apparatus according to an embodiment of the present disclosure.

Referring to FIG. 1, the AF camera apparatus includes an AF lens groups 110, an image sensor 120, and processor 130. However, the AF camera apparatus may further include an additional hardware and/or software configurations.

The AF lens group 110 includes a plurality of lenses and physical/electrical components for moving the lenses. The AF lens group 110 is stacked in an optical axis direction, and may be fixed by maintaining a predetermined distance and being disposed in a housing.

To perform autofocusing, the processor 130 may move an AF lens group 110 in an optical axis direction according to a predetermined focus.

More particularly, the AF lens group 110 may move in a direction parallel to an optical axis and may include at least one lens and a barrel surrounding the at least one lens. Each lens is provided with a glass material passing or refracting light, and each of the lenses may be stacked horizontally in an optical axis direction. The barrel can support and fix each lens.

The processor 130 of the AF camera apparatus moves the AF lens group 110 using at least 2 motors. Specifically, the rotations of each motor are converted to a linear movement parallel to an optical axis direction and transmitted to the AF lens group 110. Further, forces transmitted by each motor may be transmitted to different parts of the barrel of the AF lens group 110; however, all the forces transmitted by each motor are transmitted parallel to the optical axis direction. Accordingly, if N number of motors are used, N times of a force can be transmitted to the AF lens group 110, as compared with the conventional process of using a single motor.

The motors may include a stepper motor, which rotates a predetermined angle according to a pulse voltage, wherein a rotation angle is proportional to the number of input pulse signals and a rotation speed is proportional to the frequency of input pulse signals. A screw is provided at an output axis of each motor, and the AF camera apparatus may include a torque transferring member for transmitting the rotational movement of the motor in the horizontal direction. An input side of the torque transferring member may convert the rotational movement to a linear movement by coupling with the screw of the motor, and an output side may be equipped with a rotating axis converting a linear movement to a rotational movement by coupling with another screw. The rotating axis of the torque transferring may transmit a torque of a motor to move the AF lens group 110 in the optical axis direction by fixing to the barrel of the AF lens group 110 and/or to a connecting member, which will be described in more detail below.

The barrel of the AF lens group 110 may be formed in a cylindrical shape, and at least one protrusion may be formed at a side of the barrel to receive the torque of the motor by coupling with the rotating axis.

The processor 130 maybe connected to each motor electrically and control rotations of each motor so that the AF lens group 110 moves according to a predetermined focus. For example, during an AF operation or even when a user inputs a touch operation to focus a subject located close or far, the processor 130 can determine a location of the AF lens group 110 corresponding to a focus location and output a control signal so that the location of the AF lens group 110 moves to the determined location.

The AF camera apparatus may include a position sensor for detecting a movement distance of at least one part of the AF lens group 110 in an optical axis direction. The processor 130 may identify a location of the AF lens group 110 in the optical axis direction based on a value detected by the position sensor, when the AF camera apparatus initializes the location of the AF lens group 110.

The AF camera apparatus may include a plurality of motors to control precisely a movement of a heavy AF lens group 110, and the processor 130 may transmit a control signal to each motor so that movement distances of the AF lens group 110 by each motor is identical and the AF lens group 110 moves precisely to a targeted location. For example, a vertical movement distance transmitted to the AF lens group 110 according to rotation movements of the plurality of motors may be identical.

As described above, the AF camera apparatus moves an AF lens group 110 using a plurality of motors, in order to precisely control the movement of the AF lens group 110, even though the AF lens group 110 may have a weight exceeding a range of an output torque supported by a single motor.

However, because each motor rotates individually and the paths of transmitting torques to the AF lens group 110 are different, a tilt may be generated because of an imbalance in the torques transmitted from the motors. Namely, the movement of the AF lens group 110 may deviate from the optical axis direction due to a difference of movement distances between a part of the barrel moving according to a rotation of a first motor and another part of the barrel moving according to a rotation of a second motor.

The tilt can be generated by various causes such as a gap or abrasion of a screw between a motor, torque transferring member, and barrel; defect of a motor; and errors in control signals transmitted electrically.

Accordingly, the AF camera apparatus may include a tilt protecting member to protect against tilt generation. For example, a tilt protecting member may have a specific elasticity and may include an elastic member for moving a contacting part of the AF lens group 110 in the optical axis direction, if the rotation of a motor exceeds a predetermined value. Further, the tilt protecting member may include a hinge, which controls the torque of each motor to be transmitted identically to each part of the barrel.

Figure 2:
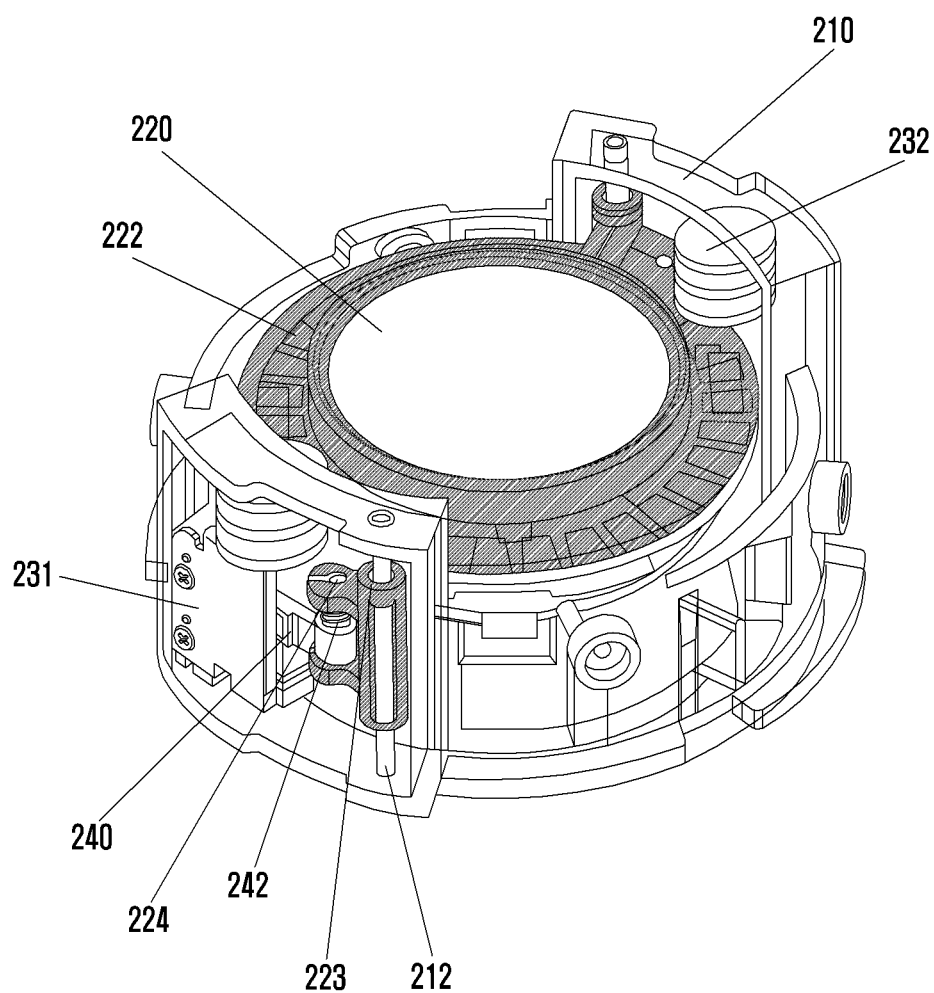
FIGS. 2 to 9 are perspective views illustrating AF camera apparatuses according to various embodiments of the present disclosure.

FIG. 2 is a perspective view illustrating an AF camera apparatus according to an embodiment of the present disclosure.

Referring to FIG. 2, at least one protrusion provided at a barrel 222 contacts at least one rotating axis 242, and the at least one protrusion and the at least one rotating axis 242 may be disposed to maintain a predetermined angle from a side of an AF lens group 220.

The AF lens group 220 is disposed in a housing 210 and may include a barrel that stacks and supports a plurality of lenses. The barrel 222 is formed in a cylindrical shape and at least one protrusion is formed at a side of the barrel 222 to contact with a rotating axis 242, which rotates by receiving torques from the housing 210, a first motor 231, and a second motor 232. The barrel 222 includes 2 protrusions located at opposite sides to each other that can be connected respectively to the first motor 231 and the second motor 232.

An output axis of the first motor 231 rotates at a position parallel to an optical axis direction (vertical direction in the drawing).

A screw is formed at the output axis of the first motor 231, and the torque transferring member 240 may be coupled with the screw formed at the output axis. An input side of the torque transferring member 240 converts a rotating movement of the first motor 231 to a linear movement by coupling with the screw of the first motor 231. A rotating axis 242 for converting the linear movement back to a rotating movement by coupling with a screw is provided at an output side of the torque transferring member 240.

A motor connection hole 224 is formed at a protrusion of the barrel 222 and moves the barrel in the optical axis direction according to the rotation of the first motor 231 by combining with the rotating axis 242 of the torque transferring member 240 through a screw.

The housing 210 includes a supporting axis 212 in the horizontal direction, and a housing connection hole 223 transpierced by the supporting axis 212 is provided at the protrusion of the barrel 222. According to the structure of the supporting axis 212 transpiercing the housing connection hole 223, the AF lens group 220 is fixed to move in a direction parallel to the optical axis direction.

The second motor 232 has the same structure as the first motor 231 and is also connected to the barrel 222 and the housing 210. Therefore, a detailed description of the structure of the second motor 232 is omitted.

In the AF camera apparatus, the protrusions of the barrel 222 corresponding to the first motor 231 and the second motor 232 may be formed by displacing each other at a predetermined angle (for example, 180 degrees). Parts of the barrel 222 can move with the same speed and distance in the opposite direction based on the center of the AF lens group 220, and thereby the AF lens group moves with a stronger force as compared when using only one motor.

Figure 3:
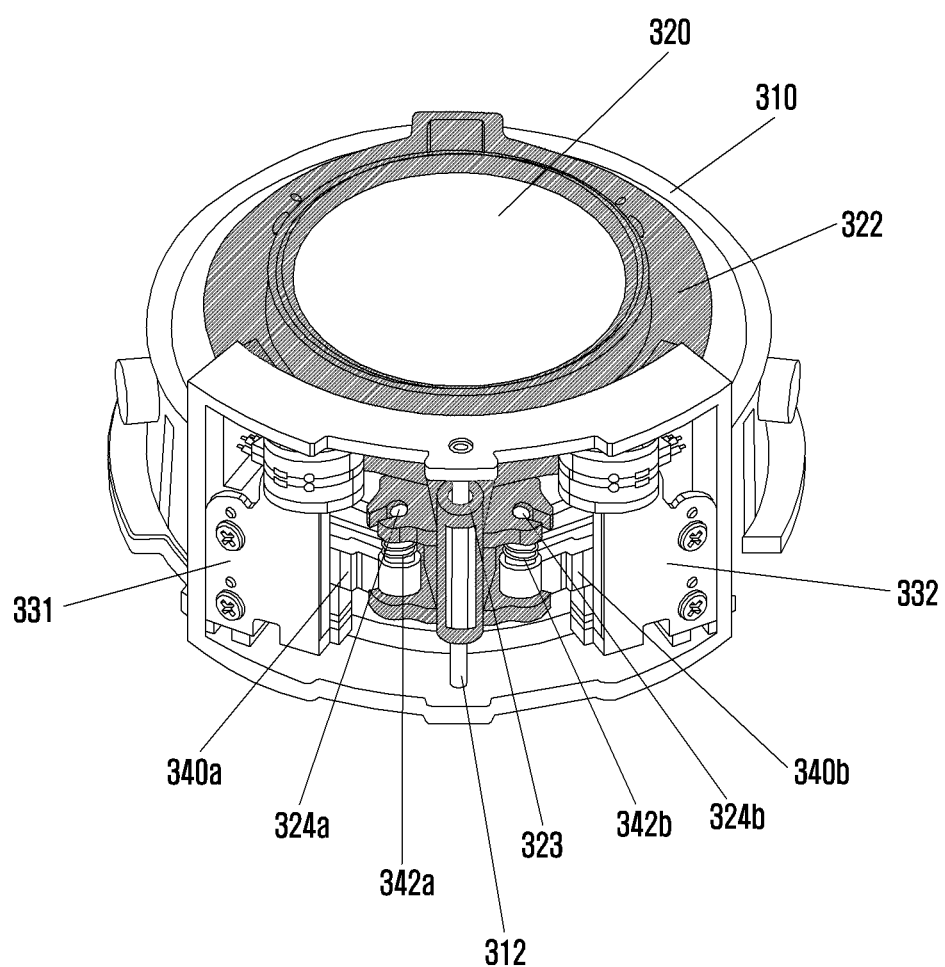

FIG. 3 is a perspective view illustrating a structure of an AF camera apparatus according to an embodiment of the present disclosure.

Referring to FIG. 3, at least one protrusion contacts with at least 2 rotation axes 342a and 342b.

More specifically, a barrel 322 is formed with a protrusion in a direction and the protrusion includes a housing connection hole 323 combined with a supporting axis 312 and two motor connection holes 324a and 324b combined respectively with the rotation axes 342a and 342b.

The housing connection hole 323 of the protrusion can move up and down in the optical axis direction by connecting to the supporting axis 312 of the housing 310.

The rotation of the first motor 331 is transmitted to a first rotating axis 342a through a first torque transferring member 340a, and the rotation of the first rotating axis 342a moves the barrel 322 up and down in the optical axis direction. The rotation of the first motor 331 and the transmission of torque through the first torque transferring member 340a are the same as described in FIG. 2.

Similarly, the rotation of the second motor 332 is transmitted to a second rotating axis 342b through a second torque transferring member 340b, and the rotation of the second rotating axis 342b moves the barrel 322 up and down in the optical axis direction.

In FIG. 3, the first motor 331 and the second motor 332 transmit torques with the same speed and distance to an AF lens group 320.

Figure 4:
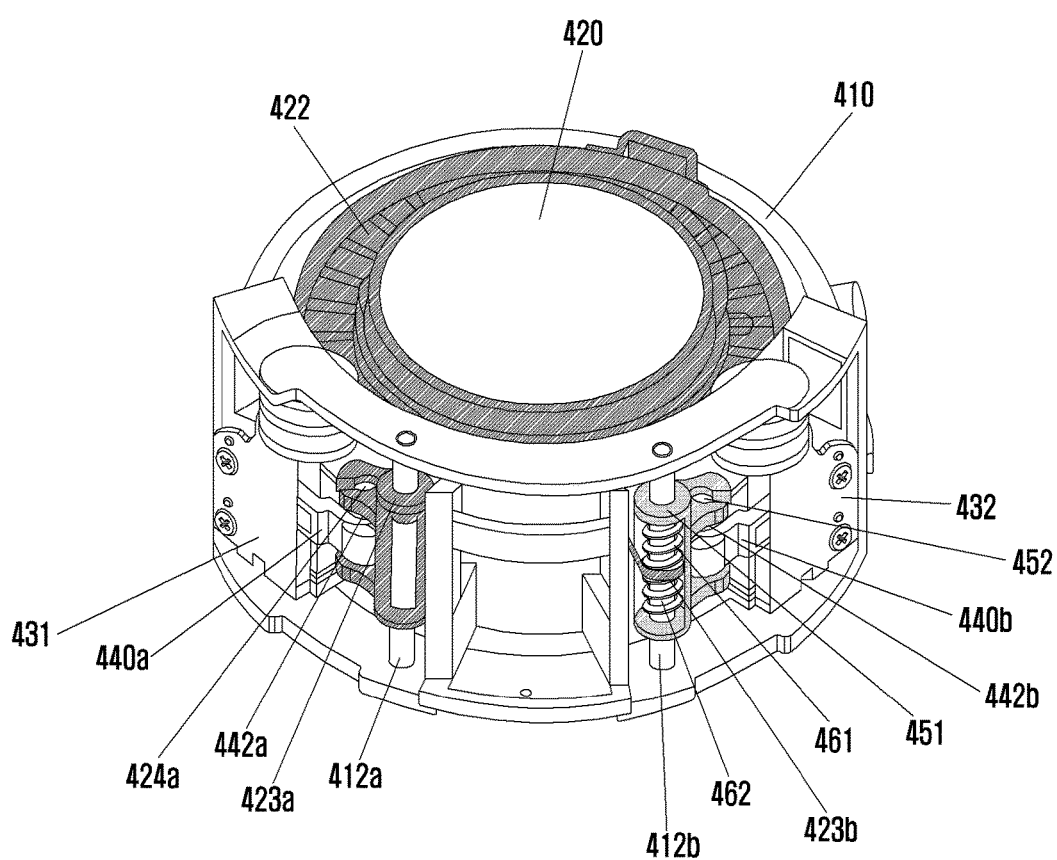

FIG. 4 is a perspective view illustrating an AF camera apparatus according to an embodiment of the present disclosure.

Referring to FIG. 4, the AF camera apparatus includes a first elastic member 461 and a second elastic member 462 to avoid a tilt generated by imbalance in torques transmitted from a first motor 431 and a second motor 432.

More specifically, a barrel 422 is formed with a protrusion in a direction, and a housing 410 is equipped with a first supporting axis 412a and a second supporting axis 412b.

The rotation of the first motor 431 is transmitted to a first rotating axis 442a through a first torque transferring member 440a, and the rotation of the first rotating axis 442a moves a barrel 422 up and down in the optical axis direction. Here, the rotation of the first motor 431 and the transmission of torques through the first torque transferring member 440a are the same as described in FIGS. 2 and 3.

The rotation of the second motor 432 is transmitted to a second rotating axis 442b through a second torque transferring member 440b, and a connecting member 450 is combined with the second rotating axis 442b. The connecting member 450 includes a rotating axis connection hole 452 connected to the second rotating axis 442b and a supporting axis connection hole 451 connected to the second supporting axis 412b of the housing 410.

The supporting axis connection hole 451 of the connecting member 450 may include two holes displaced up and down, and a second housing connection hole 423b of the barrel 422 may be connected to the second supporting axis 412b between the two holes of the supporting axis connection hole 451.

Further, a first elastic member 461 having an elastic force in an opposite direction is disposed between the upper hole of the second housing connection hole 423b and the supporting axis connection hole 451 by fixing to one of the upper hole of the second housing connection hole 423b and the supporting axis connection hole 451 and by surrounding the supporting axis 412b. A second elastic member 462 having an elastic power in an opposite direction is disposed between the supporting axis connection hole 451 and the lower hole of the second housing connection hole 423b by fixing to one of the supporting axis connection hole 451 and the lower hole of the second housing connection hole 423b and by surrounding the supporting axis 412b.

The first elastic member 461 and the second elastic member 462 have a specific elastic force and elastically support the movement of an AF lens group 420 in the optical axis direction, and thereby can move a contact part of the AF lens group 420 in the optical axis direction if the rotation of the second motor 432 is greater than a predetermined value.

For example, if the first motor 431 and the second motor 432 rotate so that the AF lens group 420 moves in the downward direction, the first rotating axis 442a and a motor connection hole 424a of the first motor 431 are fixed and the AF lens group 420 can move in the downward direction. Here, although the connecting member 450 may move in the downward direction according to the rotation of the second motor 432, the rotation of the second motor 432 does not influence the movement of the AF lens group 420 in a certain range because of the elastic force of the first elastic member 461. Namely, the first elastic member 461 contracts in a certain range according to the rotation of the second motor 432. After the first elastic member 461 reaches a limit of elasticity, the AF lens group 420 can move in the downward direction according to the rotation of the second motor 432.

In FIG. 4, a drive relay or a drive deviation can be compensated by an elastic force of an elastic member although a tilt is generated by imbalance in torques transmitted by each motor.

Figure 5:
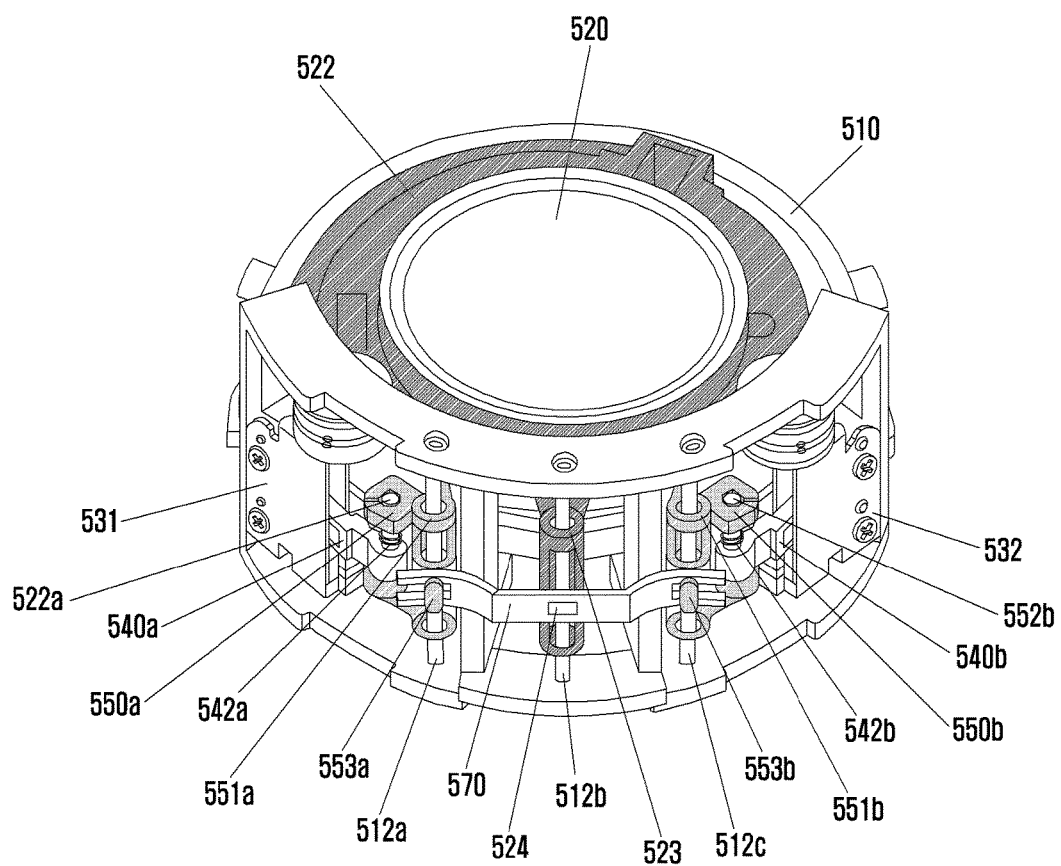

FIG. 5 is a perspective view illustrating an AF camera apparatus according to an embodiment of the present disclosure.

Referring to FIG. 5, the AF camera apparatus includes a hinge 570 to avoid a tilt generated by imbalance of torques transmitted from a first motor 531 and a second motor 532.

More specifically, a housing 510 includes a first supporting axis 512a, a second supporting axis 512b, and a third supporting axis 512c.

The rotation of the first motor 531 is transmitted to a first rotating axis 542a through a first torque transferring member 540a, and the first rotating axis 542a may be configured to connect with a first rotating axis connection hole 552a of the first connecting member 550a. Similarly, the rotation of the second motor 532 may be transmitted to a second torque transferring member 540b and a second rotating axis connection hole 552b of the second connecting member 550b.

The first connecting member 550a and the second connecting member 550b include respectively a protruded first hinge connector 553a and a protruded second hinge connector 553b, and the hinge 570 synchronizes movements of the first connecting member 550a and the second connecting member 550b by connecting to the first hinge connector 553a and the second hinge connector 553b.

A housing connection hole 523 of a barrel 522 synchronizes the hinge 570 and the barrel 522 through a hinge connector 524 by connecting to the third supporting axis 512c movable in an optical axis direction.

In FIG. 5, the torques of the first motor 531 and the second motor 532 are combined through the hinge 570 to move the AF lens group 520 in the optical axis direction, and a tilt prevented because the barrel 522 does not move parts differently.

Figure 6:
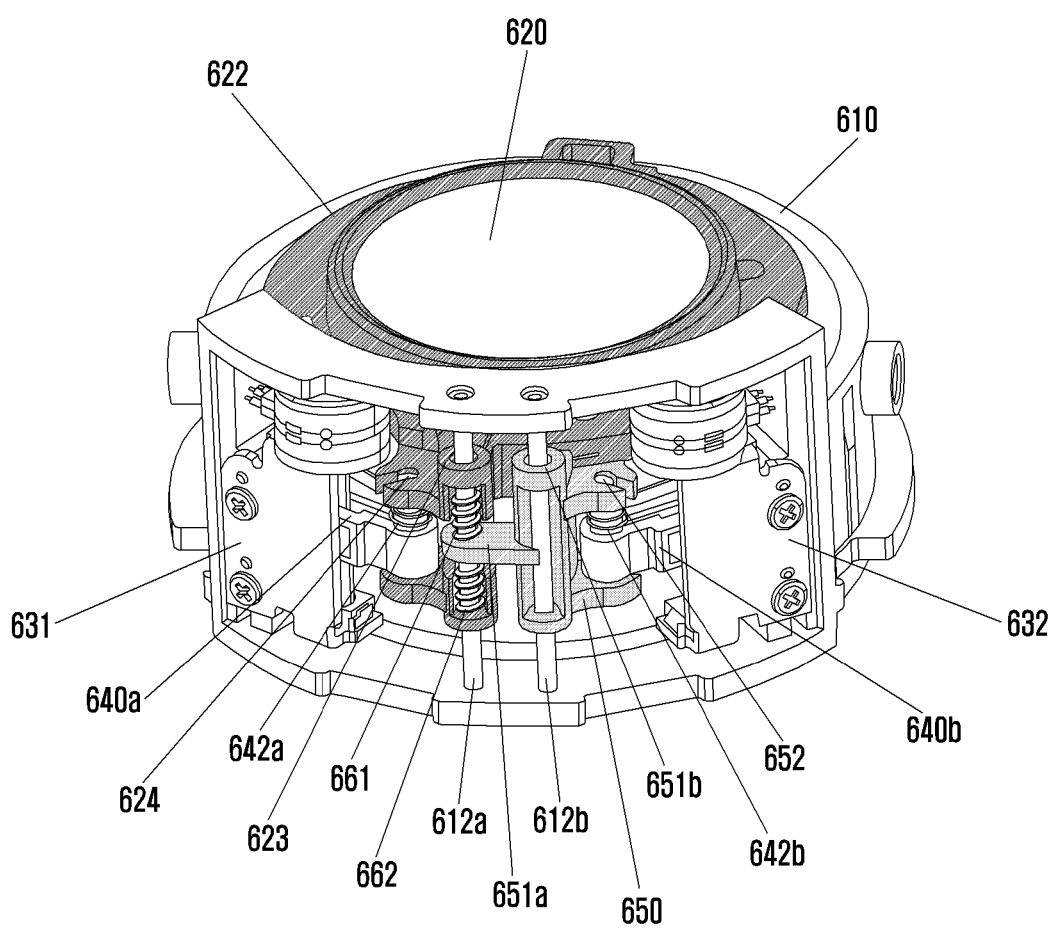

FIG. 6 is a perspective view illustrating an AF camera apparatus according to an embodiment of the present invention.

Referring to FIG. 6, a tilt is avoided by including a first elastic member 661 and a second elastic member 662, similar to the embodiment illustrated in FIG. 4.

More specifically, a housing 610 includes a first supporting axis 612a and a second supporting axis 612b.

The rotation of a first motor 631 is transmitted to a first rotating axis 642a through a first torque transferring member 640a, and the first rotating axis 642a is connected to a motor connection hole 624 of a barrel 622.

The second rotating axis 642b is connected to a rotating axis connection hole 652 of a connecting member 650 differently from the first rotating axis 642a, and the connecting member 650 includes a first supporting axis connection hole 651a transpierced by the first supporting axis 612a and a second supporting axis connection hole 651b transpierced by the second supporting axis 612b. The first supporting axis connection hole 651a includes a hole fixed in the center of the first supporting axis 612a, and a housing connection hole 623 of the barrel 622 can be connected to the first supporting axis 612a through upper and lower holes.

The first elastic member 661 has an elastic force in an opposite direction and is formed between an upper hole of the housing connection hole 623 and the first supporting axis connection hole 651a by fixing to one of the upper hole of the housing connection hole 623 and the first supporting axis connection hole 651a and by surrounding the first supporting axis 612a. The second elastic member 662 has an elastic force in an opposite direction and is formed between the first supporting axis connection hole 651a and a lower hole of the housing connection hole 623 by fixing to one of the first supporting axis connection hole 651a and the lower hole of the housing connection hole 623 and by surrounding the first supporting axis 612a.

The first elastic member 661 and the second elastic member 662 have a specific elastic force and elastically support the movement of an AF lens group 620 in the optical axis direction, such that a contact part of the AF lens group 620 may move in the optical axis direction if the rotation of the second motor 632 is greater than a predetermined value.

Figure 7:
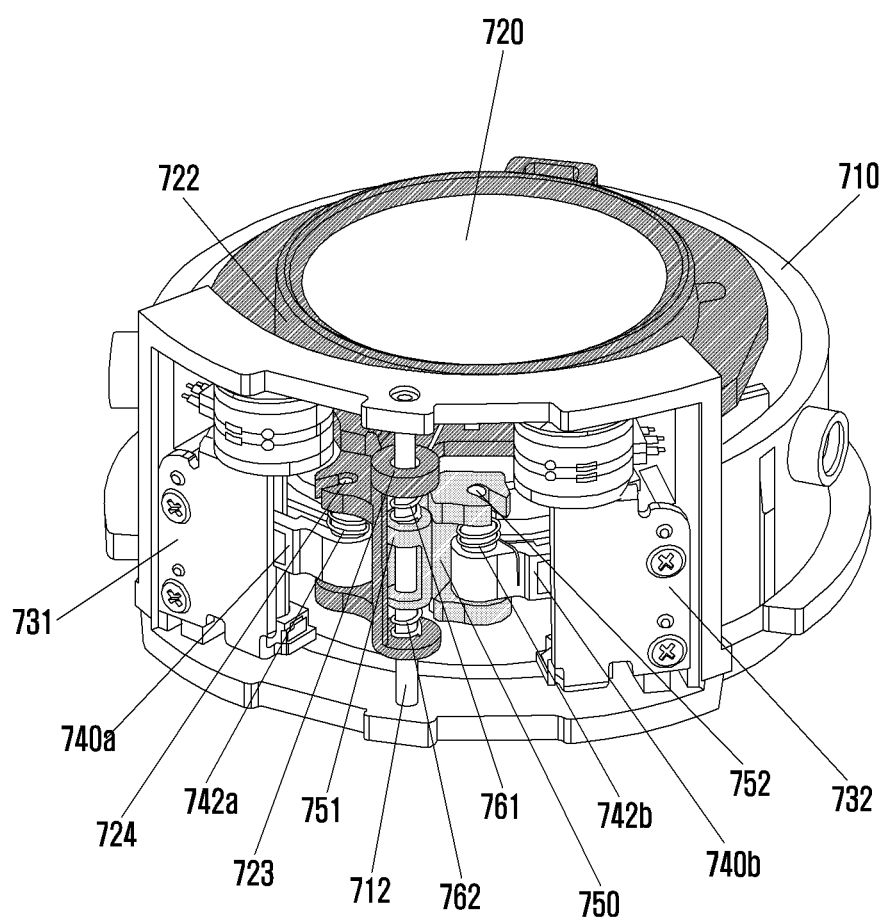

FIG. 7 is a perspective view illustrating an AF camera apparatus according to an embodiment of the present disclosure.

Referring to FIG. 7, a tilt is avoided by including a first elastic member 761 and a second elastic member 762, similar to the embodiments illustrated in FIGS. 4 and 6.

More specifically, a housing 710 is equipped with a supporting axis 712. The rotation of a first motor 731 is transmitted to a first rotating axis 742a through a torque transferring member 740a, and the first rotating axis 742a is connected to a motor connection hole 724 of a barrel 722.

A second rotating axis 742b is connected to a rotating axis connection hole 752 of a connecting member 750 and the connecting member 750 includes a supporting axis connection hole 751 transpierced by the supporting axis 712. The supporting axis connection hole 751 may include upper and lower holes displaced from each other.

A housing connection hole 723 of the barrel 722 may be configured in a form that a supporting axis 712 transpierces the housing connection hole 723 of the barrel 722 and the supporting axis connection hole 751 of the connecting member 750 by combining with the supporting axis 712 through the upper and lower holes.

The first elastic member 761 having an elastic force in an opposite direction is provided between the upper hole of the housing connection hole 723 of the barrel 722 and the upper hole of the supporting axis connection hole 751 of the connecting member 750 by fixing to one of the upper hole of the housing connection hole 723 and the upper hole of the supporting axis connection hole 751. The second elastic member 762 having an elastic force in an opposite direction is provided between the lower hole of the supporting axis connection hole 751 and the lower hole of the housing connection hole 723 by fixing to one of the lower hole of the supporting axis connection hole 751 and the lower hole of the housing connection hole 723.

Figure 8:
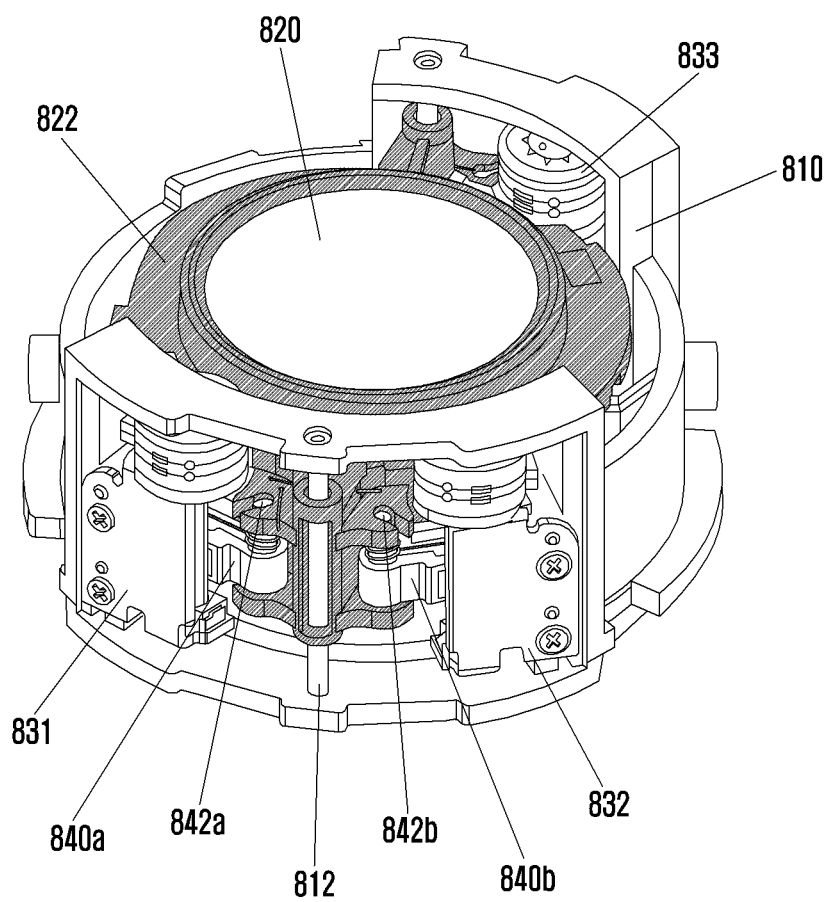

FIG. 8 is a perspective view illustrating An AF camera apparatus according to an embodiment of the present disclosure.

Referring to FIG. 8, an AF lens group 820 is moved using a first motor 831, a second motor 832, and a third motor 833.

More specifically, the AF camera apparatus includes two protrusions. One of the protrusions may include the configuration of the protrusion of the camera apparatus according to the embodiment illustrated in FIG. 3, and the other of the protrusions may include the configuration of the protrusion of the camera apparatus according to the embodiment illustrated in FIG. 2.

The protrusion located at the front side is provided so that the first motor 831 and the second motor 832 are combined with a barrel 822 through a first torque transferring member 840a and a second torque transferring member 840b, respectively. Although not shown in the drawing, the other protrusion is located at the rear side so that the third motor 833 is combined with the barrel 822 through a third torque transferring member.

Although FIG. 8 illustrates a configuration of transmitting the rotations of the first motor 831 and the second motor 832 to the AF lens group 820, which has the structure of the embodiment illustrated in FIG. 3, another structure may also be applied.

Figure 9:
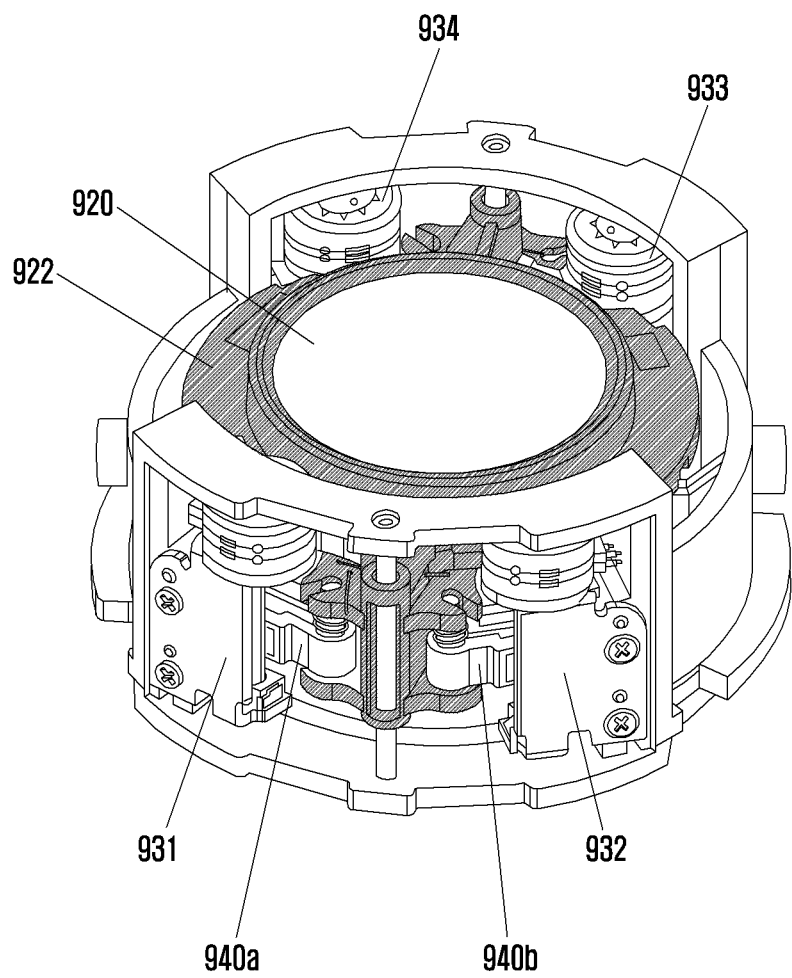

FIG. 9 is a perspective view illustrating an AF camera apparatus according to an embodiment of the present disclosure.

Referring to FIG. 9, an AF lens group 920 is moved using a first motor 931, a second motor 932, a third motor 933, and a fourth motor 934.

More specifically, the AF camera apparatus includes 2 protrusions. Each of the protrusions may have the same configuration of the protrusion of the AF camera apparatus according to the embodiment illustrated in FIG. 3

The protrusion located at the front side is provided so that the first motor 931 and the second motor 932 are combined with a barrel 922 through a first torque transferring member 940a and a second torque transferring member 940b, respectively. Although not shown in the drawing, the other protrusion located at the rear side can be provided so that the third motor 933 and the fourth motor 934 are combined with the barrel 922 through a third torque transferring member and a fourth torque transferring member, respectively.

Although FIG. 9 illustrates a configuration for transmitting the rotations of the first motor 931 and the second motor 932 or the third motor 933 and the fourth motor 934 to the AF lens group, which has the same structure of the embodiment illustrated in FIG. 3, another structure may also be applied.

The above-described embodiments of the present disclosure provide a mechanism for more precisely moving a heavy AF lens in an AF camera apparatus using multiple motors.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An autofocus (AF) camera apparatus comprising:
a housing;
an AF lens group disposed in the housing;
a processor configured to generate a control signal to control movement of the AF lens group according to a determined focus location;
a plurality of motors configured to move the AF lens group in an optical axis direction according to the control signal of the processor; and
a tilt protecting member including an elastic member configured to surround a supporting axis disposed in the optical axis direction in the housing to elastically support the movement of the AF lens group generated by rotations of the motors.

2. The AF camera apparatus of claim 1, wherein the AF lens group comprises:
a lens; and
a barrel configured to support and move the lens in the optical axis direction according to rotations of the motors surrounding the lens.

3. The AF camera apparatus of claim 2, wherein each of the motors is configured to transmit a torque to a respective part of the barrel to move that the AF lens group in the optical axis direction.

4. The AF camera apparatus of claim 3, wherein each of the motors rotates so that the respective parts of the barrel traverse an identical distance in the optical axis direction.

5. The AF camera apparatus of claim 3, wherein the tilt protecting member is configured to avoid a tilt generated by imbalance in torques transmitted from the at least 2 motors.

6. The AF camera apparatus of claim 5, wherein the elastic member is further configured to move a contact part of the AF lens group in the optical axis direction, if the rotation of one of the motors is greater than a predetermined value.

7. The AF camera apparatus of claim 5, further comprising:
a plurality of torque transferring members configured to rotate by receiving torques respectively from the motors; and
a plurality of connecting members configured to move in the optical axis direction by respectively fixing to a rotating axis of one of the torque transferring members,
wherein the tilt protecting member comprises a hinge configured to move the connecting members by fixing them with each other.

8. The AF camera apparatus of claim 1, wherein at least one of the motors comprises a stepper motor configured to rotate a predetermined angle according to the control signal.

9. The AF camera apparatus of claim 1, further comprising a position sensor configured to detect a movement distance of the AF lens group in the optical axis direction.

10. An autofocus (AF) camera apparatus comprising:
a housing;
an AF lens group disposed in the housing, the AF lens group including a lens and a barrel surrounding the lens; and
a plurality of motors configured to transmit torque to a part of the barrel to move the AF lens group in an optical axis direction,
wherein a protrusion is disposed at a side of the barrel so that the housing contacts a rotating axis that rotates by receiving torque from at least one of the motors.

11. The AF camera apparatus of claim 10, wherein a supporting axis disposed in the optical axis direction in the housing transpierces and contacts a part of the protrusion in the optical axis direction such that the rotating axis that rotates by receiving torque from at least one of the motors moves the AF lens group in the optical axis direction.

12. The AF camera apparatus of claim 11, wherein the protrusion contacts with the rotating axis, and the protrusion and the rotating axis are disposed to maintain a predetermined angle from a side of the AF lens group.

13. The AF camera apparatus of claim 11, wherein the protrusion contacts a plurality rotating axes.

14. The AF camera apparatus of claim 11, further comprising an elastic member configured to surround the supporting axis, to elastically support the movement of the AF lens group generated by the rotation of at least one of the motors, and to move a contact part of the AF lens group in the optical axis direction, if the rotation of the at least one of the motors is greater than a predetermined value.

15. The AF camera apparatus of claim 11, further comprising:
a plurality of torque transferring members configured to rotate by receiving torques respectively from the motors;
a plurality of connecting members configured to move in the optical axis direction by respectively fixing to a rotating axis of one the torque transferring members; and
a hinge configured to move the connecting members by fixing them with each other.

16. A method of autofocusing an autofocus (AF) camera apparatus, the method comprising:
determining, by a processor, a determined focus location;

generating a control signal to control movement of an AF lens group according to the determined focus location; and operating a plurality of motors to move the AF lens group in an optical axis direction according to the control signal of the processor, wherein a tilt protecting member including an elastic member is configured to surround a supporting axis disposed in the optical axis direction in the housing to elastically support the movement of the AF lens group generated by rotations of the operated motors.

* * * * *